United States Patent
Hafele et al.

(10) Patent No.: US 10,995,890 B2
(45) Date of Patent: May 4, 2021

(54) QUICK-CONNECT COUPLER

(71) Applicant: MAT INDUSTRIES, LLC, Long Grove, IL (US)

(72) Inventors: Nicholas Steven Hafele, Cincinnati, OH (US); Rodney A. Ratz, Brookville, IN (US)

(73) Assignee: MAT INDUSTRIES, LLC, Long Grove, IL (US)

( * ) Notice: Subject to any disclaimer, the term of this patent is extended or adjusted under 35 U.S.C. 154(b) by 386 days.

(21) Appl. No.: 16/136,083

(22) Filed: Sep. 19, 2018

(65) Prior Publication Data
US 2019/0086013 A1  Mar. 21, 2019

Related U.S. Application Data

(60) Provisional application No. 62/560,404, filed on Sep. 19, 2017.

(51) Int. Cl.
| *F16L 37/23* | (2006.01) |
| *F16L 37/42* | (2006.01) |
| *F16B 21/16* | (2006.01) |
| *F16L 25/14* | (2006.01) |

(52) U.S. Cl.
CPC .............. *F16L 37/23* (2013.01); *F16L 37/42* (2013.01); *F16B 21/165* (2013.01); *F16L 25/14* (2013.01)

(58) Field of Classification Search
CPC . F16L 37/23; F16L 37/42; F16L 25/14; F16B 21/165
See application file for complete search history.

(56) References Cited

U.S. PATENT DOCUMENTS

| 2,641,272 | A | | 6/1953 | Seale | |
| 3,131,905 | A | | 5/1964 | Nyberg | |
| 3,567,175 | A | | 3/1971 | Sciuto, Jr. | |
| 3,873,062 | A | | 3/1975 | Johnson et al. | |
| 5,167,398 | A | | 12/1992 | Wade et al. | |
| 5,211,197 | A | * | 5/1993 | Marrison | F16L 37/23 137/614 |
| 5,445,358 | A | * | 8/1995 | Anderson | F16L 37/23 251/149.6 |

(Continued)

FOREIGN PATENT DOCUMENTS

CN  2872043 U  2/2007

*Primary Examiner* — James M Hewitt, II
(74) *Attorney, Agent, or Firm* — Greer, Burns & Crain, Ltd.

(57) ABSTRACT

A quick-connect coupler includes an input, a main body, an inner sleeve, a ball retainer, a valve, and outer and inner balls. The main body is coupled with the input. The inner sleeve is disposed in the interior chamber of the main body and is slidably coupled with the main body. The ball retainer defines an interior chamber and a second aperture. The ball retainer is disposed in the interior chamber of the main body and is slidably coupled with the main body. The valve defines a passageway and is disposed in the interior chamber of the ball retainer. The valve is slidably coupled with the input. The inner and outer balls are disposed in the first and second apertures. respectively. The interior chamber of the main body defines a first diameter. The interior chamber of the ball retainer defines a second diameter that is less than the first diameter.

12 Claims, 7 Drawing Sheets

(56) References Cited

U.S. PATENT DOCUMENTS

| | | | |
|---|---|---|---|
| 5,806,564 A * | 9/1998 | Wilcox | F16L 37/35 |
| | | | 137/614 |
| 5,845,943 A | 12/1998 | Ramacier, Jr. et al. | |
| 6,131,961 A | 10/2000 | Heilmann | |
| 6,575,430 B1 | 6/2003 | Smith, III | |
| 6,612,618 B2 | 9/2003 | Giordano | |
| 6,702,254 B2 | 3/2004 | Noble et al. | |
| 6,745,413 B2 | 6/2004 | Pinciaro | |
| 6,834,666 B2 | 12/2004 | Murayama et al. | |
| 7,165,571 B1 | 1/2007 | Buzdum | |
| 7,926,783 B1 * | 4/2011 | Liu | F16L 37/23 |
| | | | 251/149.9 |
| 2014/0116533 A1 | 5/2014 | Edler | |

* cited by examiner

QUICK-CONNECT COUPLER

REFERENCE TO RELATED APPLICATION

This application claims priority of U.S. provisional patent application Ser. No. 62/560,404, entitled Quick-Connect Coupler, filed Sep. 19, 2017, and hereby incorporates this provisional patent application by reference herein in its entirety.

TECHNICAL FIELD

This application relates generally to a versatile quick-connect coupler. In particular, the versatile, quick-connect coupler can be configured for releasable coupling with different sizes of quick-connect fittings.

BACKGROUND

Some conventional pneumatic quick-connect couplers can be configured for coupling with different plug types of quick-connect fittings having the same body size.

BRIEF DESCRIPTION OF THE DRAWINGS

It is believed that certain embodiments will be better understood from the following description taken in conjunction with the accompanying drawings in which.

DETAILED DESCRIPTION

Figure 1:
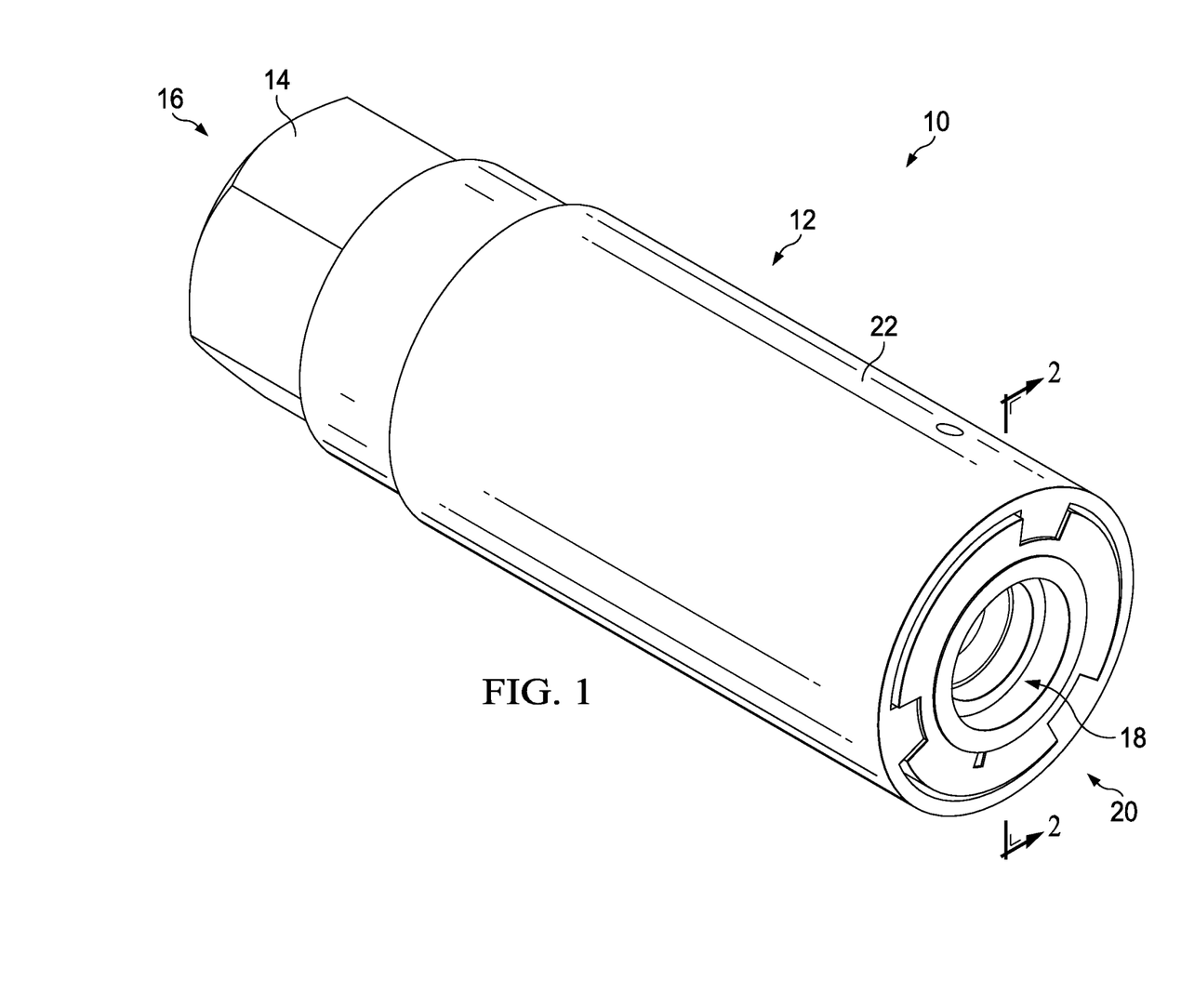
FIG. 1 is an isometric view depicting a quick-connect coupler, in accordance with one embodiment.
Figure 2:
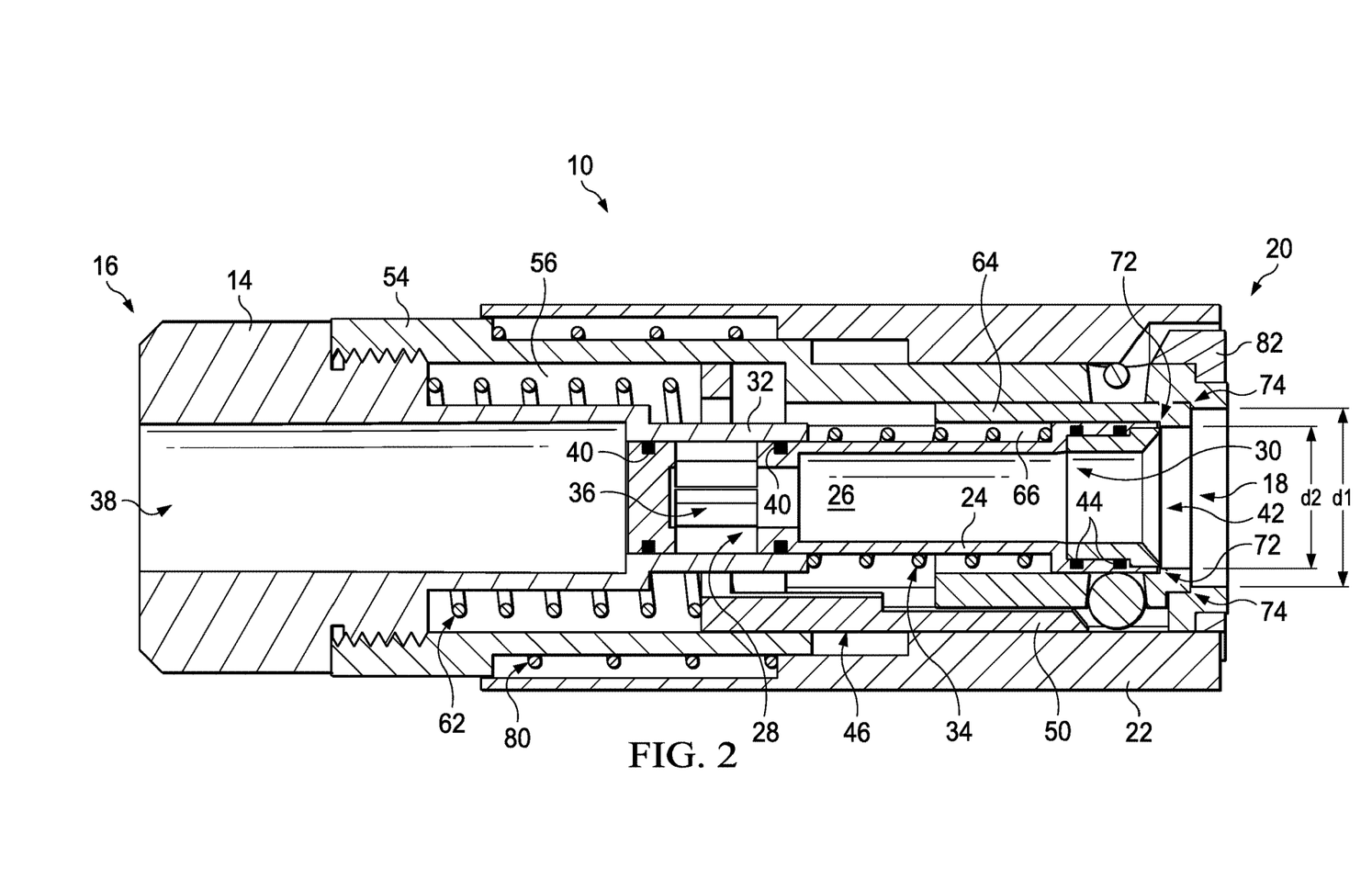
FIG. 2 is a cross-sectional view taken along the line 2-2 in FIG. 1.
Figure 3:
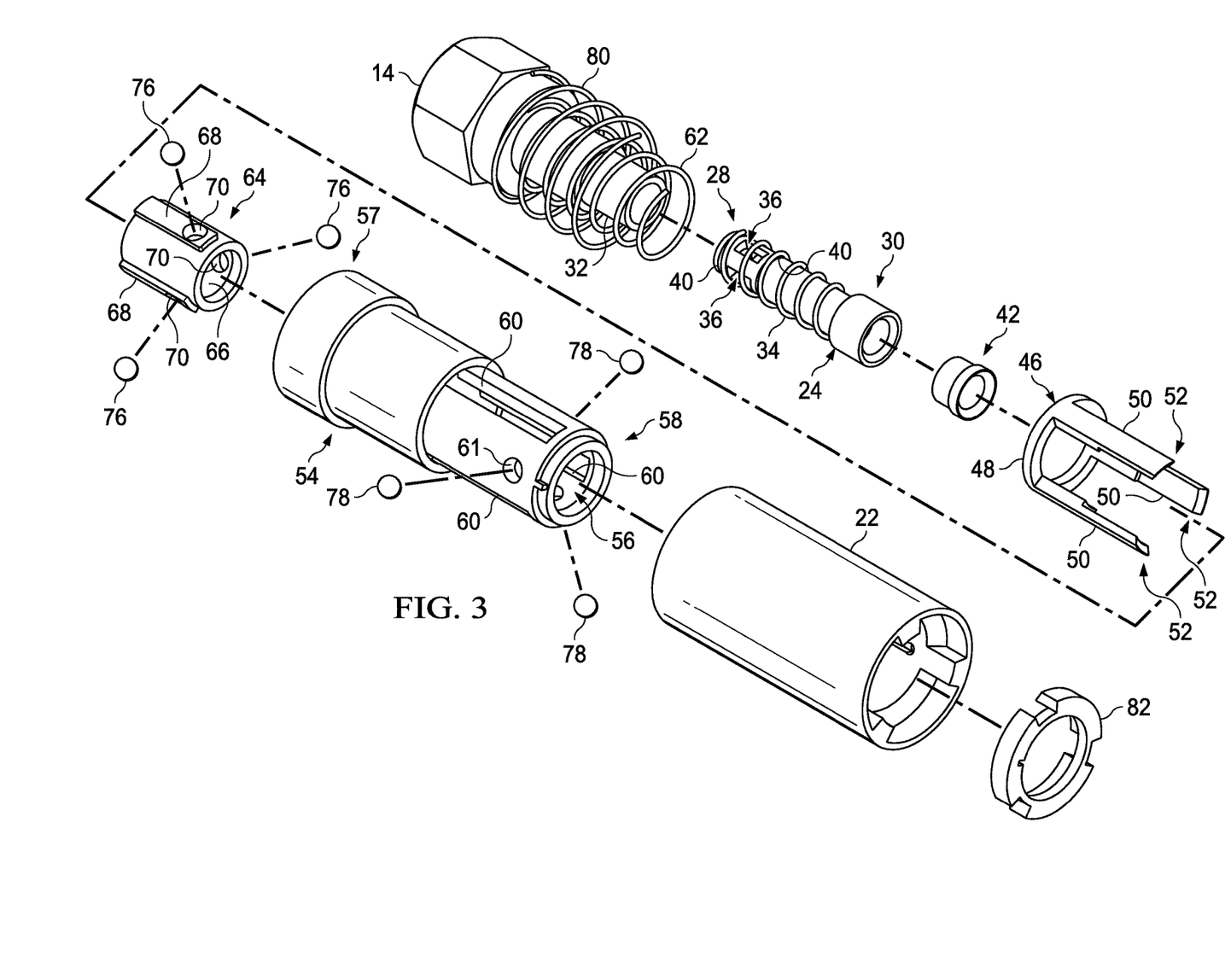
FIG. 3 is an exploded isometric view depicting the quick-connect coupler of FIG. 1.

Embodiments are hereinafter described in detail in connection with the views and examples of FIGS. 1-9, wherein like numbers indicate the same or corresponding elements throughout the views. As illustrated in FIGS. 1-3, a versatile, quick-connect coupler 10 (hereinafter "the coupler") facilitates releasable coupling of a fluid powered tool, such as a power tool, air nozzle, a fluid hose or a fluid storage tank, for example, to a fluid source such that the coupler 10 is provided upstream of the fluid source and downstream of the fluid powered tool. The coupler 10 can include a body 12 and an input 14 that is threadably attached with the body 12 at a rear end 16 of the coupler 10. The input 14 can be fluidly coupled with a fluid source, such as an air compressor (not shown) or another external source of pressurized air or other fluid. The body 12 can define a fluid supply port 18 disposed at a front end 20 of the coupler 10. The fluid supply port 18 can be configured to receive a body of a quick-connect fitting that is associated with a tool or other fluid powered device. The body 12 can include a sleeve 22 which can be slid towards the rear end 16 (e.g., into a retracted position) to facilitate selective coupling or decoupling of the body of a quick-connect fitting to/from the coupler 10, as will be described in further detail below. It will be appreciated that although the coupler 10 is described for use in a pneumatic system, the coupler 10 can be configured for use in any of a variety of suitable alternative fluid powered systems, such as a hydraulic system, for example.

Figure 7:
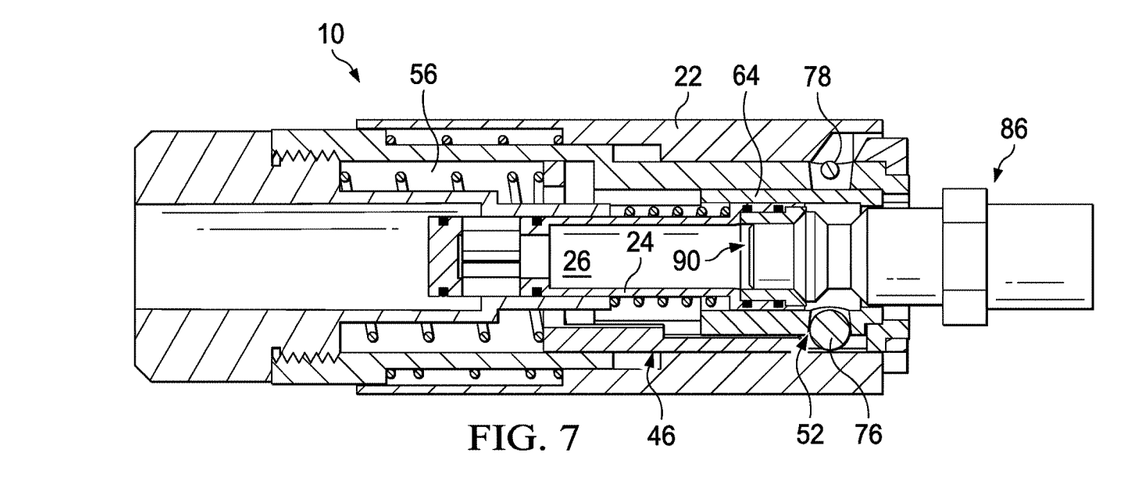
FIG. 7 is a cross-sectional view depicting the quick-connect coupler of FIG. 6 but with the narrow-bodied fitting shown fully installed in the quick-connect coupler.
Figure 9:
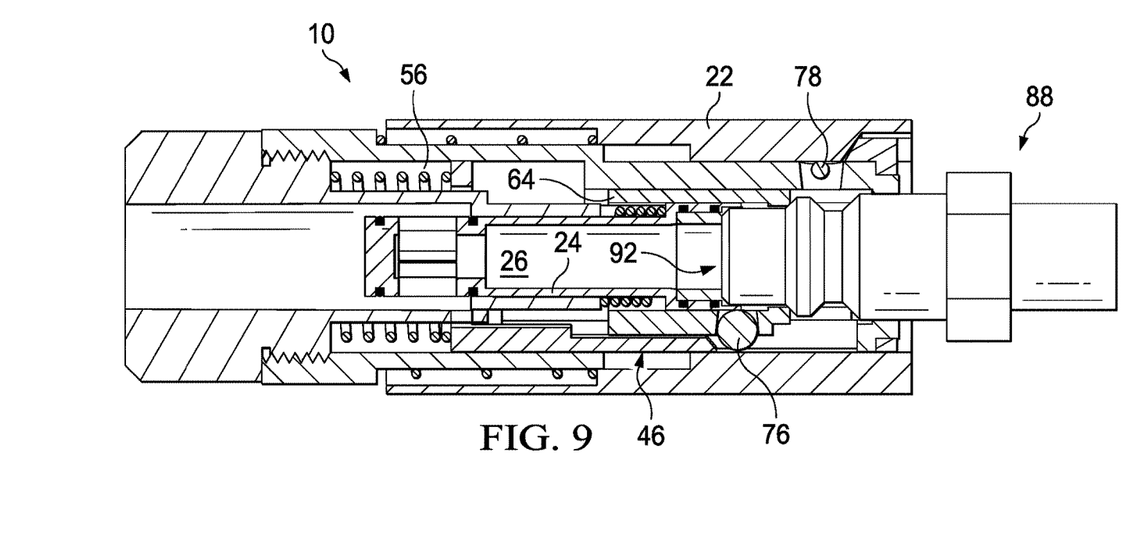
FIG. 9 is a cross-sectional view depicting the quick-connect coupler of FIG. 8 but with the wide-bodied fitting shown fully installed in the quick-connect coupler.

Referring now to FIGS. 2 and 3, the coupler 10 can include a valve 24 that defines a passageway 26 (FIG. 2) and has a proximal end 28 (FIG. 3) and a distal end 30 (FIG. 3). As illustrated in FIG. 3, the proximal end 28 can be disposed in a collar 32 of the input 14 and slidably coupled with the input 14. The valve 24 can be slidable between an extended position (FIG. 2) and a retracted position (FIGS. 7 and 9). A spring 34 can bias the valve 24 into the extended position. The proximal end 28 can include a plurality of through holes 36 that are in fluid communication with the passageway 26. When the valve 24 is in the extended position, the proximal end 28 can be disposed in the collar 32 and the through holes 36 are fluidly isolated from the input 14 (by way of the collar 32) such that no pressurized fluid from an input port 38 of the input 14 is permitted into the passageway 26. When the valve 24 is in the retracted position, the proximal end 28 of the valve 24 can extend into the input 14 (away from the collar 32) such that the through holes 36 facilitate fluid communication between the passageway 26 of the valve 24 and the input port 38 of the input 14 to allow fluid from the pressurized fluid source to flow through the passageway 26 of the valve 24. A pair of O-rings 40 can be disposed between the proximal end 28 of the valve 24 and the collar 32 to facilitate a fluid seal therebetween.

Referring again to FIGS. 2 and 3, a valve seat 42 can be seated against the distal end 30 of the valve 24. The valve seat 42 can be formed of a resilient material, such as an elastomeric or thermoplastic material, to facilitate sealed engagement with a body of a quick-connect fitting, as will be described in further detail below. A pair of O-rings 44 can be disposed between the valve seat 42 and the distal end 30 of the valve 24 to facilitate a fluid seal therebetween.

Figure 4:
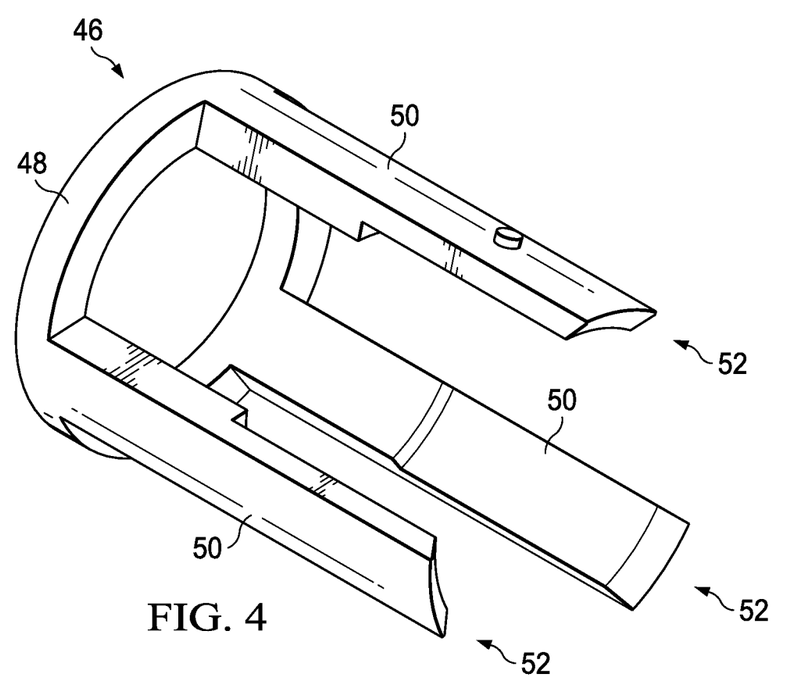
FIG. 4 is an isometric view depicting an inner sleeve of the quick-connect coupler of FIG. 1.

Referring now to FIGS. 3 and 4, the coupler 10 can include an inner sleeve 46 that includes a central portion 48 and a plurality of finger members 50 that extend from the central portion 48. Each of the finger members 50 can include a chamfered distal end 52 (FIG. 4).

Referring again to FIGS. 2 and 3, the coupler 10 can include a main body 54 that is threadably coupled with the input 14. The main body 54 can define an interior chamber 56 and can extend between a proximal end 57 (FIG. 3) and a distal end 58 (FIG. 3). The main body 54 can at least partially define the fluid supply port 18 (FIG. 2). As illustrated in FIG. 3, the distal end 58 of the main body 54 can define a plurality of elongated exterior slots 60 and a plurality of apertures 61 (one shown). Each of the apertures 61 can be disposed in one of the elongated exterior slots 60. As illustrated in FIG. 2, the inner sleeve 46 can be disposed in the interior chamber 56 of the main body 54 such that each of the finger members 50 is disposed in one of the elongated exterior slots 60. The inner sleeve 46 can be slidably coupled with the main body 54 and slidable between an extended position (FIG. 7) and a retracted position (FIG. 2). The inner sleeve 46 can be biased toward the distal end 58 of the main body 54 by a spring 62. The interior chamber 56 can define a diameter d1 of the fluid supply port 18.

Figure 8:
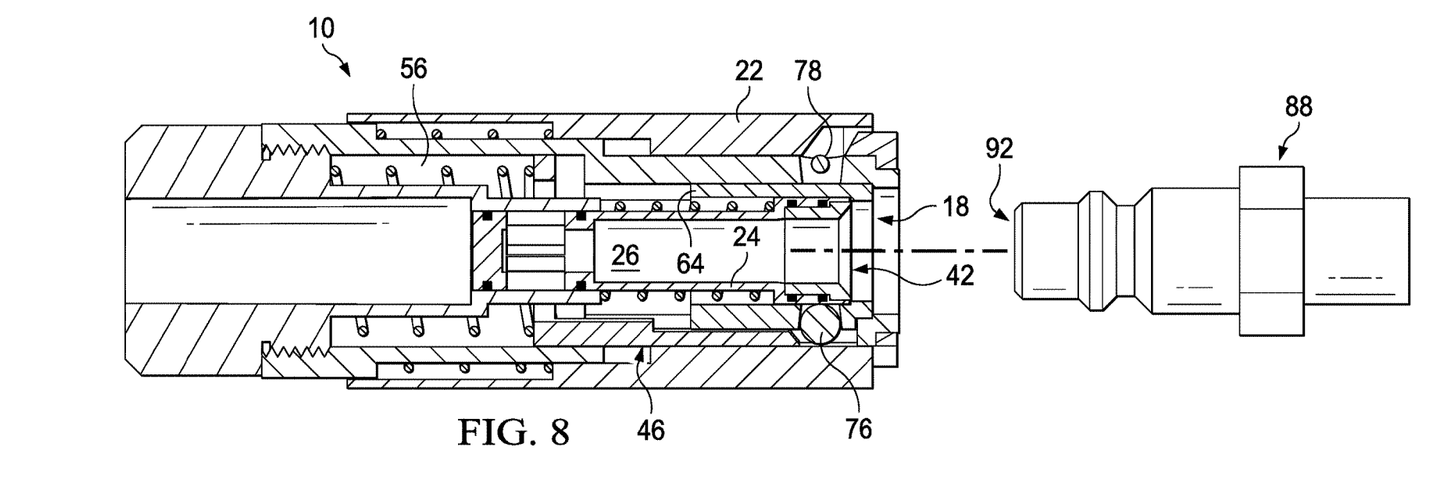
FIG. 8 is a cross-sectional view that is similar to FIG. 2 but with a sleeve shown in a retracted position and a wide-bodied fitting associated with the quick-connect coupler.

Referring again to FIGS. 2 and 3, the coupler 10 can include a ball retainer 64 that defines an interior chamber 66 and includes a plurality of raised portions 68 that each defines an aperture 70. The ball retainer 64 can be disposed in the distal end 58 of the main body 54 (e.g., in the interior chamber 56 of the main body 54) and can be slidably coupled with the main body 54 such that the ball retainer 64 is slidable between an extended position (FIGS. 2, 6 and 7) and a retracted position (FIG. 8).

As illustrated in FIG. 2, the valve 24 can be disposed in the interior chamber 66 of the ball retainer 64 such that the valve 24 extends through each of the interior chamber 56 of the main body 54 and the interior chamber 66 of the ball retainer 64. The interior chamber 66 can define a diameter d2 of the fluid supply port 18 that is smaller than the diameter d1 defined by the interior chamber 56. The distal end 30 of the valve 24 can engage a shoulder 72 of the ball retainer 64 that facilitates housing of the valve 24 in the ball retainer 64. In particular, the shoulder 72 can prevent the distal end 30 of the valve 24 from being extended beyond the ball retainer 64. In such a configuration, the spring 34 associated with the valve 24 can also bias the ball retainer 64 towards the front end 20 of the coupler 10. The ball retainer 64 can engage a shoulder 74 of the main body 54 that facilitates housing of the ball retainer 64 in the main body 54 and can prevent the ball retainer 64 from being extended beyond the main body 54.

Referring now to FIG. 3, the coupler 10 can include a plurality of inner balls 76 and a plurality of outer balls 78. Each of the inner balls 76 can interact with one of the apertures 70 of the ball retainer 64 and each of the outer balls 78 can interact with one of the apertures 61 of the main body 54 to facilitate retention of different body sizes of quick-connect fittings in the fluid supply port 18 of the coupler 10, as will be described in further detail below. In one embodiment, each of the inner balls 76 and the outer balls 78 can have substantially the same diameter. In another embodiment, some or all of the inner balls 76 can have a different diameter than some or all of the outer balls 78.

Figure 5:
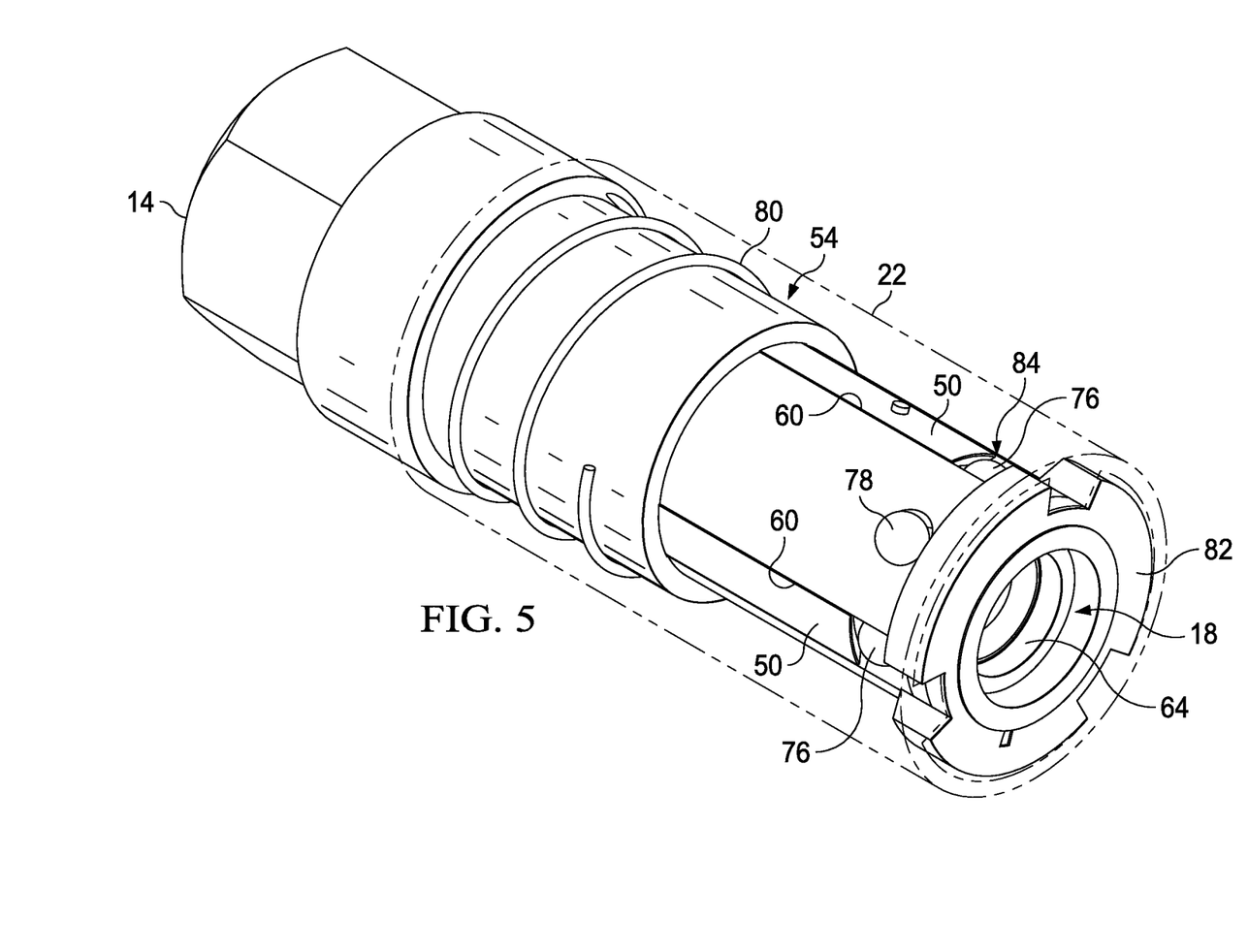
FIG. 5 is an assembled isometric view depicting the quick-connect coupler of FIG. 1 with a sleeve shown in dashed lines.

Referring now to FIG. 5, an assembled view of the coupler 10 is illustrated with the sleeve 22 shown in dashed lines. The sleeve 22 can be slidably coupled with the main body 54 and can surround the inner and outer balls 76, 78. The sleeve 22 can be biased toward the front end 20 of the coupler 10 (e.g., into a released position) by a spring 80. A stop member 82 can be secured to the main body 54 and can interact with the sleeve 22 to prevent the sleeve 22 from being extended beyond the main body 54.

Each of the finger members 50 of the inner sleeve 46 can cooperate with one of the elongated exterior slots 60 to define a ball receptacle 84. Each ball receptacle 84 can be aligned with one of the apertures 70 of the ball retainer 64 such that each of the inner balls 76 is disposed in one of the ball receptacles 84 when associated with the aperture 70 such that the inner balls 76 are disposed between the ball retainer 64 and the sleeve 22. Each of the outer balls 78 can be disposed between the main body 54 and the sleeve 22.

When the sleeve 22 is in the released position, as shown in FIG. 5, the sleeve 22 can interact with the outer balls 78 to urge each of the outer balls 78 away from the apertures 61 (FIG. 3) and towards the interior chamber 56 of the main body 54. The chamfered distal ends 52 of each of the finger members 50 can engage the inner balls 76 to urge the inner balls 76 towards the interior chamber 66 of the ball retainer 64. The inner balls 76 can have a greater diameter than the diameter of the apertures 70, and the outer balls 78 can have a greater diameter than the diameter of the apertures 61. As such, when the inner balls 76 are engaged with the apertures 70, a portion of each inner ball 76 can extend through one of the apertures 70 and into the interior chamber 66 of the ball retainer 64. In addition, when the outer balls 78 are engaged with the apertures 61, a portion of each outer ball 78 can extend through one of the apertures 61 and into the interior chamber 56 of the main body 54. The portions of the inner and outer balls 76, 78 that extend into the respective interior chambers 66, 56 can facilitate retention of different plug bodies within the fluid supply port 18, as will be described in further detail below.

Figure 6:
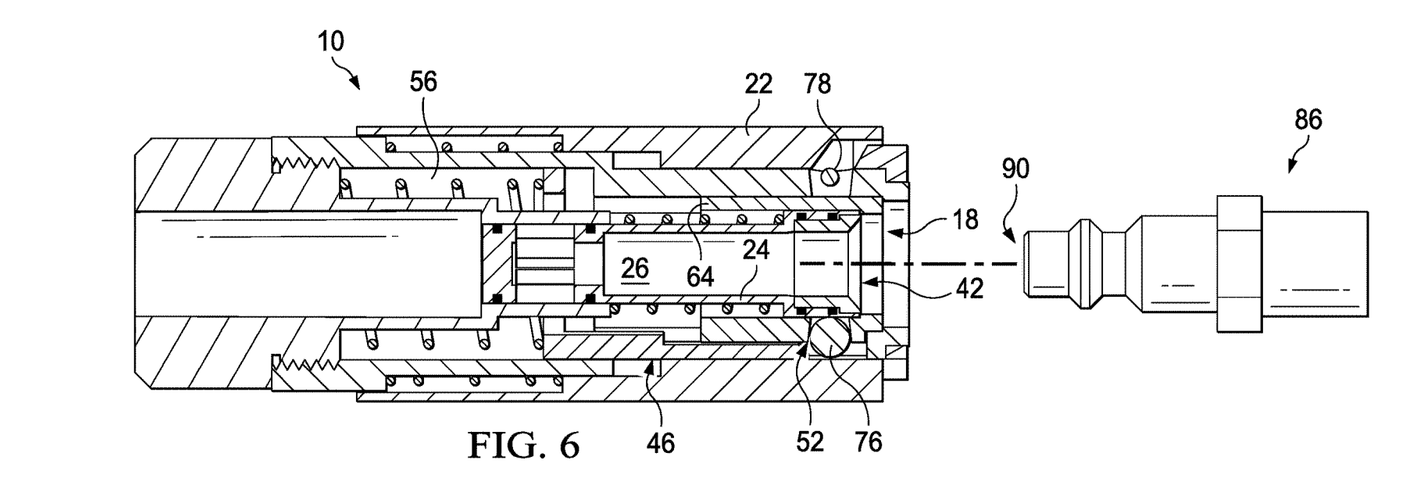
FIG. 6 is a cross-sectional view that is similar to FIG. 2 but with a sleeve shown in a retracted position and a narrow-bodied fitting associated with the quick-connect coupler.

When the sleeve 22 is slid into a retracted position (e.g., towards the rear end 16 of the coupler 10 as illustrated in FIGS. 6 and 8), the inner and outer balls 76, 78 can be released away from the respective apertures 70, 61 and out of the respective interior chambers 66, 56 to facilitate releasing of the plug body from the coupler 10, as will be described in further detail below.

As will be described below, the coupler 10 can be coupled with fittings having different fitting body sizes, different fitting body styles (e.g., automotive, ARO, versatile, industrial, and high flow fitting types) and/or different fitting body lengths. In one embodiment, the coupler 10 can be configured to accommodate a narrow-bodied fitting 86, as illustrated in FIGS. 6 and 7, and a wide-bodied fitting 88, as illustrated in FIGS. 8 and 9. In such an embodiment, the diameter d1 of the interior chamber 56 of the main body 54 can be sized to receive the wide-bodied fitting 88 (e.g., about 0.375 inches) and the diameter d2 of the interior chamber 66 of the ball retainer 64 can be sized to receive the narrow-bodied fitting 86 (e.g., about 0.25 inches). In such an embodiment, the narrow-bodied fitting 86 can be a 0.25 inch body size and the wide-bodied fitting 88 can be a 0.375 inch body size. It is to be appreciated that the coupler 10 can be configured to accommodate any of a variety of other fitting sizes, lengths, and or styles. For example, the coupler 10 can be configured to accommodate narrow-bodied fittings and wide-bodied fittings having one of a 0.25 inch body size, a 0.375 inch body size, a 0.5 inch body size, or a 0.75 inch body size. It is to be appreciated that the narrow-bodied fitting 86 and the wide-bodied fitting 88 can be sized in accordance with any of a variety of industry standards such as ARO 210 and ARO 310, metric sizes, or other standardized body sizes (e.g., Lincoln).

Coupling of the narrow-bodied fitting 86 to the coupler 10 will now be discussed relative to FIGS. 6 and 7. As illustrated in FIG. 6, prior to inserting the narrow-bodied fitting 86 into the fluid supply port 18, the sleeve 22 can be manually slid to the retracted position which can release the inner and outer balls 76, 78. The narrow-bodied fitting 86 can then be inserted into the fluid supply port 18 until a tip portion 90 of the narrow-bodied fitting 86 initially engages the valve seat 42 of the valve 24. As the narrow-bodied fitting 86 continues to be inserted into the fluid supply port 18, the narrow-bodied fitting 86 can push the valve 24 from the extended position to the retracted position to allow for pressurized fluid from the pressurized fluid source to flow through the passageway 26 of the valve 24 and to the narrow-bodied fitting 86. Since the narrow-bodied fitting 86 fits within the interior chamber 66 of the ball retainer 64, the ball retainer 64 can be maintained in the extended position (into substantial engagement with the shoulder 74 of the main body 54) by the spring 62 during sliding of the valve 24 which can block the outer balls 78 from accessing/engaging the narrow-bodied fitting 86. As the valve 24 is sliding into the retracted position, the inner sleeve 46 can slide from the retracted position (FIG. 2) to the extended position (via the spring 62) and the chamfered distal ends 52 of the finger members 50 can urge the inner balls 76 into the interior chamber 66 of the ball retainer 64 and into engagement with the narrow-bodied fitting 86. Once the narrow-bodied fitting 86 is fully inserted in the fluid supply port 18, the sleeve 22 can then be released and automatically slid to the released position (e.g., via the spring 80) to secure the narrow-bodied fitting 86 in place. FIG. 7 is a sectional view of the narrow-bodied fitting 86 fully installed on the coupler 10. To release the narrow-bodied fitting 86 from the coupler 10, the sleeve 22 can be manually slid to the retracted position which can remove the inner balls 76 from the interior chamber 66 and out of engagement with the narrow-bodied fitting 86 to allow the narrow-bodied fitting 86 to be pulled away from the coupler 10.

Coupling of the wide-bodied fitting 88 to the coupler 10 will now be discussed relative to FIGS. 8 and 9. As illustrated in FIG. 8, prior to inserting the wide-bodied fitting 88 into the fluid supply port 18, the sleeve 22 can be manually slid to the retracted position which can release the inner and outer balls 76, 78. The wide-bodied fitting 88 can then be inserted into the fluid supply port 18 until a tip portion 92 of the wide-bodied fitting 88 initially engages the valve seat 42 of the valve 24 and the rest of the wide-bodied fitting 88 engages the ball retainer 64. As the wide-bodied fitting 88 continues to be inserted into the fluid supply port 18, the valve 24 and the ball retainer 64 can slide together from their respective extended positions to their respective retracted positions and the inner sleeve 46 can travel together with the valve 24 and the ball retainer 64 to pull the inner balls 76 away from the wide-bodied fitting 88. With the valve 24 in the retracted position, pressurized fluid from the pressurized fluid source can be permitted to flow through the passageway 26 of the valve 24 and to the wide-bodied fitting 88. With the ball retainer 64 in the retracted position and the wide-bodied fitting 88 disposed in the interior chamber 56 of the main body 54, the outer balls 78 can access the wide-bodied fitting 88. Once the wide-bodied fitting 88 is fully inserted in the fluid supply port 18, the sleeve 22 can then be released and automatically slid to the released position (e.g., via the spring 80) to urge the outer balls 78 into engagement with the wide-bodied fitting 88 to secure the wide-bodied fitting 88 to the coupler 10. FIG. 9 is a sectional view of the wide-bodied fitting 88 fully installed on the coupler 10. To release the wide-bodied fitting 88 from the coupler 10, the sleeve 22 can be manually slid to the retracted position which can move the outer balls 78 out of engagement with the wide-bodied fitting 88 to allow the wide-bodied fitting 88 to be pulled away from the coupler 10.

It is to be appreciated that, although the fittings 86, 88 are shown to be automotive-style pneumatic fittings, the configuration of the coupler 10 illustrated in FIGS. 1-5 can be arranged to be compatible with other styles of fittings, such as ARO, versatile, industrial, and high flow, for example (for the different body sizes disclosed). It is also to be appreciated that the valve 24 can be slidable to accommodate for different lengths of the various body sizes and styles that are compatible with the coupler 10. As such, the coupler 10 can be compatible with more body sizes, styles, and body lengths that conventional couplers such that the coupler 10 can be considered to be a universal coupler.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. In some embodiments, the drawings can be understood to be drawn to scale. The scope of the disclosure is, of course, not limited to the examples or embodiments set forth herein, but can be employed in any number of applications and equivalent devices by those of ordinary skill in the art. Rather it is hereby intended that the scope of the disclosure be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A quick-connect coupler comprising:
an input configured for fluid coupling with a fluid source;
a main body extending between a proximal end and a distal end and defining an interior chamber and a first aperture, the main body being coupled with the input and at least partially defining a fluid supply port that is configured to receive a body of a quick connect fitting for providing pressurized fluid thereto;
an inner sleeve disposed in the interior chamber of the main body and slidably coupled with the main body, the inner sleeve being slidable between a retracted position and an extended position;
a ball retainer defining an interior chamber and a second aperture, the ball retainer being disposed in the interior chamber of the main body and slidably coupled with the main body, the ball retainer being slidable between a retracted position and an extended position;
a valve defining a passageway and disposed in the interior chamber of the ball retainer, the valve being slidably coupled with the input and slidable between a retracted position and an extended position to facilitate selective fluid communication between the input and the passageway;
an outer ball disposed in the first aperture;
an inner ball disposed in the second aperture, wherein:
the interior chamber of the main body defines a first diameter;
the interior chamber of the ball retainer defines a second diameter that is less than the first diameter; and
the main body defines an elongated exterior slot; the first aperture is disposed in the elongated exterior slot; the inner sleeve comprises a central portion and a finger member that extends from the central portion; and the finger member is disposed in the elongated exterior slot and cooperates with the slot to define a ball receptacle that is aligned with the first aperture.

2. The quick-connect coupler of claim 1 wherein the first diameter is about 0.375 inches and the second diameter is about 0.25 inches.

3. The quick-connect coupler of claim 1 wherein the finger member comprises a chamfered distal end that facilitates urging of the inner ball into the interior chamber of the main body when the inner sleeve is slid to the extended position.

4. The quick-connect coupler of claim 1 wherein, when the valve is slid to the retracted position relative to the ball retainer, the inner ball extends into the interior chamber of the ball retainer.

5. The quick-connect coupler of claim 1 wherein, when the valve and the ball retainer are slid together into their respective retracted positions relative to the main body, the outer ball extends into the interior chamber of the main body.

6. The quick-connect coupler of claim 1 wherein each of the valve, the ball retainer, and the inner sleeve are biased into their respective extended positions by respective springs.

7. A quick-connect coupler comprising:
an input configured for fluid coupling with a fluid source;
a main body extending between a proximal end and a distal end and defining an interior chamber, a plurality of first apertures, and a plurality of elongated exterior slots, the main body being coupled with the input and at least partially defining a fluid supply port that is configured to receive a body of a quick connect fitting for providing pressurized fluid thereto;
an inner sleeve comprising central portion and a plurality of finger members that each extends from the central portion, the inner sleeve disposed in the interior chamber of the main body and slidably coupled with the main body, the inner sleeve being slidable between a retracted position and an extended position;
a ball retainer defining an interior chamber and a plurality of second apertures, the ball retainer being disposed in the interior chamber of the main body and slidably coupled with the main body, the ball retainer being slidable between a retracted position and an extended position;
a valve defining a passageway and disposed in the interior chamber of the ball retainer, the valve being slidably coupled with the input and slidable between a retracted position and an extended position to facilitate selective fluid communication between the input and the passageway;
a plurality of outer balls, each outer ball of the plurality of outer balls disposed in one of the first apertures of the plurality of first apertures;
a plurality of inner balls, each inner ball of the plurality of inner balls disposed in one of the second apertures of the plurality of second apertures, wherein:
each first aperture of the plurality of first apertures is disposed in one of the elongated exterior slots of the plurality of elongated exterior slots;
each finger member of the plurality of finger members is disposed in one of the elongated exterior slots;
each finger member of the plurality of finger members cooperates with one of the elongated exterior slots to define a plurality of ball receptacles, each ball receptacle of the plurality of ball receptacles being aligned with one of the first apertures of the plurality of first apertures;
the interior chamber of the main body defines a first diameter;
the interior chamber of the ball retainer defines a second diameter that is less than the first diameter; and
each of the valve, the ball retainer, and the inner sleeve are biased into their respective extended positions by respective springs.

8. The quick-connect coupler of claim 7 wherein the first diameter is about 0.375 inches and the second diameter is about 0.25 inches.

9. The quick-connect coupler of claim 8 wherein the finger member comprises a chamfered distal end that facilitates urging of the inner ball into the interior chamber of the main body when the inner sleeve is slid to the extended position.

10. The quick-connect coupler of claim 7 wherein, when the valve is slid to the retracted position relative to the ball retainer, the inner ball extends into the interior chamber of the ball retainer.

11. The quick-connect coupler of claim 7 wherein, when the valve and the ball retainer are slid together into their respective retracted positions relative to the main body, the outer ball extends into the interior chamber of the main body.

12. A quick-connect coupler comprising: an input configured for fluid coupling with a fluid source; a main body extending between a proximal end and a distal end and defining an interior chamber and a first aperture, the main body being coupled with the input and at least partially defining an fluid supply port that is configured to receive a body of a quick connect fitting for providing pressurized fluid thereto; an inner sleeve disposed in the interior chamber of the main body and slidably coupled with the main body, the inner sleeve being slidable between a retracted position and an extended position; a ball retainer defining an interior chamber and a second aperture, the ball retainer being disposed in the interior chamber of the main body and slidably coupled with the main body, the ball retainer being slidable between a retracted position and an extended position; a valve defining a passageway and disposed in the interior chamber of the ball retainer, the valve being slidably coupled with the input and slidable between a retracted position and an extended position to facilitate selective fluid communication between the input and the passageway; an outer ball disposed in the first aperture; an inner ball disposed in the second aperture, wherein: the interior chamber of the main body defines a first diameter; the interior chamber of the ball retainer defines a second diameter that is less than the first diameter; and wherein, when the valve is slid to the retracted position relative to the ball retainer, the inner ball extends into the interior chamber of the ball retainer.

* * * * *